United States Patent [19]

Shimizu

[11] 4,180,294

[45] Dec. 25, 1979

[54] FLUID PRESSURE CONTROL VALVE FOR VEHICLE BRAKING SYSTEMS

[75] Inventor: Hidetoshi Shimizu, Susono, Japan

[73] Assignee: Toyota Jidosha Kogyo Kabushiki Kaisha, Toyota, Japan

[21] Appl. No.: 971,198

[22] Filed: Dec. 19, 1978

[30] Foreign Application Priority Data

Dec. 28, 1977 [JP] Japan .................................. 52-160512

[51] Int. Cl.² .............................................. B60T 13/00
[52] U.S. Cl. .................... 303/6 C; 303/22 R
[58] Field of Search .................... 303/6 C, 22 R, 23 R

[56] References Cited

U.S. PATENT DOCUMENTS

| 3,603,648 | 9/1971 | Reznicek | 303/6 C |
| 3,709,568 | 1/1973 | Miyake | 303/22 R |

*Primary Examiner*—Reinhard J. Eisenzopf
*Attorney, Agent, or Firm*—Kenyon & Kenyon

[57] ABSTRACT

In a fluid pressure control valve unit incorporated between a master cylinder and rear wheel brake cylinders, a spring loaded stepped sleeve member associates with a differential piston to provide a cut-off valve. In case the front-wheel braking system is not operated due to some damage, the sleeve member moves from its usual position to apply the braking pressure directly to the rear-wheel brake cylinders.

5 Claims, 5 Drawing Figures

FLUID PRESSURE CONTROL VALVE FOR VEHICLE BRAKING SYSTEMS

BACKGROUND OF THE INVENTION

The present invention relates to a system for controlling the braking fluid pressure in a wheeled vehicle, and more particularly to a fluid pressure control valve unit incorporated between a master cylinder and rear-wheel brake cylinders to avoid locking and skidding of the rear-wheels.

SUMMARY OF THE INVENTION

The primary object of the present invention is to provide a fluid pressure control valve unit wherein in case the front-wheel braking system is not operated due to some damage, the function of the control valve unit becomes inoperative to apply the braking fluid pressure directly to the rear-wheel brake cylinders so as to ensure the braking operation of the vehicle.

According to the present invention there is provided a fluid pressure control valve unit for a vehicle braking system incorporated between a master cylinder and rear-wheel brake cylinders, which comprises a housing provided with an inlet port for connection to the master cylinder, an outlet port for connection to the brake cylinders, and a stepped cylindrical bore including small and large diameter portions in open communication with the inlet and outlet ports respectively; a stepped sleeve member slidably disposed within the cylindrical bore and engaged at one end thereof with the inner end-wall of the housing to enclose the outlet port, the sleeve member having small and large pressure receiving areas exposed within the small and large diameter portions of the bore and subdividing the bore into a first chamber in communication with the inlet port and a second chamber in the form of an annular chamber normally isolated from the outlet port and communicated with the first chamber therethrough; a first spring for loading the sleeve member in the direction toward a usual position in which the second chamber is isolated from the outlet port; a differential piston axially reciprocable within the sleeve member to provide a third chamber in open communication with the outlet port, the piston having small and large effective piston areas whereby opposing displacement forces may be provided on the piston respectively in the directions toward and away from the outlet port; valve means including a valve seat provided within the sleeve member and a valve part of the piston cooperable with the valve seat to control intercommunication between the first and third chambers in dependence upon the displaced position of the piston; and a second spring for loading the piston in the direction toward a usual position in which the valve means opens to permit fluid communication between the first and third chambers.

In operation of the control valve unit, when the stepped sleeve member moves toward the first chamber against loading of the first spring, the second chamber opens toward the third chamber to supply the braking fluid pressure therefrom directly into the outlet port. This ensures the braking operation of the vehicle in spite of damage of the front-wheel braking system.

BRIEF DESCRIPTION OF THE DRAWINGS

Additional objects and advantages of the present invention will be more readily apparent form the following detailed description of preferred embodiments thereof when taken together with the accompanying drawings, in which.

DESCRIPTION OF THE PREFERRED EMBODIMENTS

Figure 1:
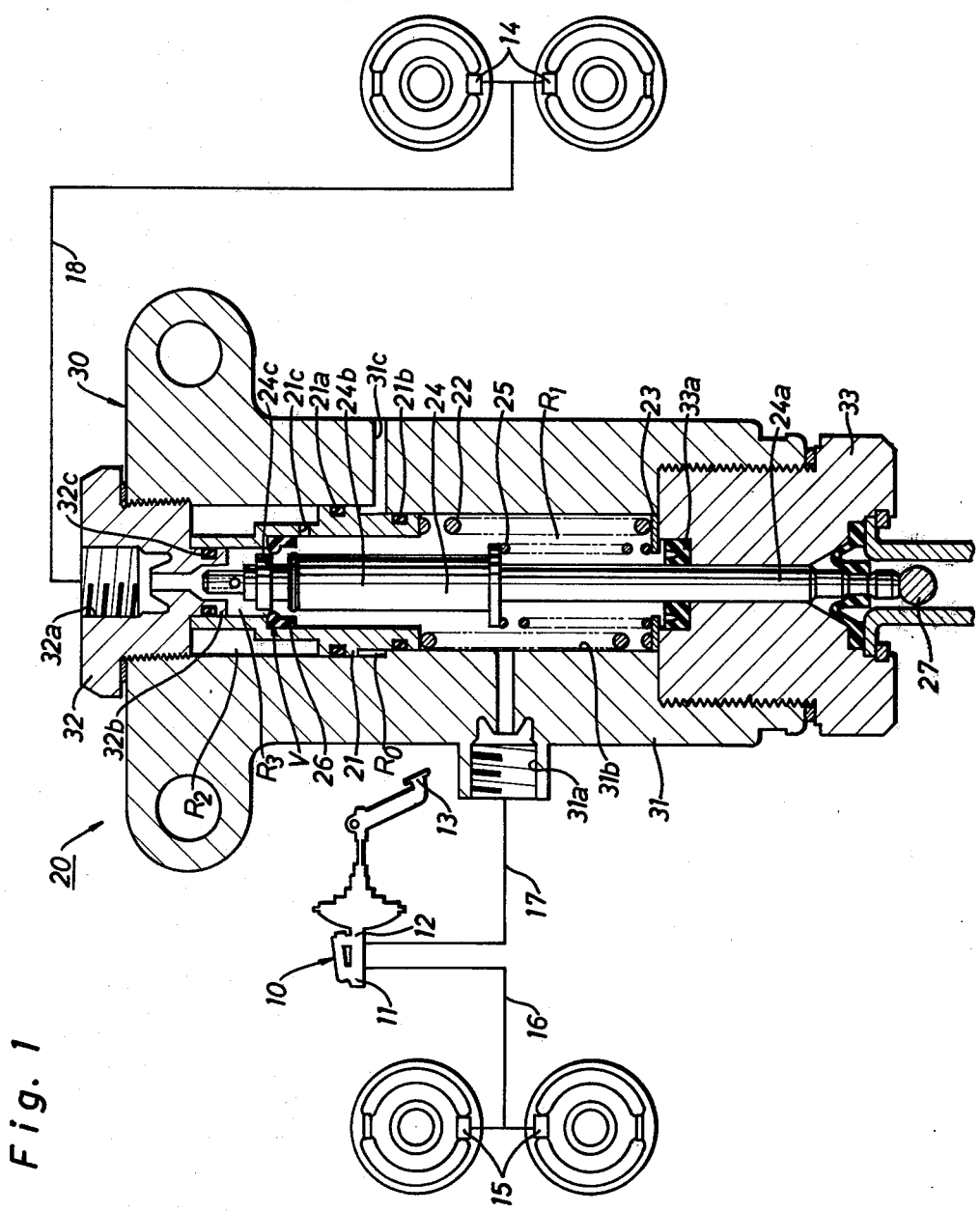
FIG. 1 illustrates a vertical cross-section of a fluid pressure control valve unit according to the present invention.

Reference will now be made to FIG. 1 of the accompanying drawings in which a master cylinder 10 is operatively connected with a brake foot-pedal 13 to produce hydraulic braking pressure in response to depression of the pedal 13. A first pressure chamber 11 of master cylinder 10 is directly connected to front-wheel brake cylinders 15 by way of a hydraulic conduit 16, and a second pressure chamber 12 of master cylinder 10 is also connected to rear-wheel brake cylinders 14 by way of a hydraulic conduit 17, a fluid pressure control valve unit 20 and a hydraulic conduit 18. Thus, hydraulic pressure produced in the master cylinder 10 is applied directly to the front-wheel cylinders 15 and at the same time to the rear-wheel cylinders 14 after being regulated, as will be explained hereinafter, by the fluid pressure control valve unit 20 depending upon the vehicle load.

The fluid pressure control valve unit 20 comprises a housing assembly 30 which includes a housing body 31 defining a stepped cylindrical bore 31b and provided therein with an inlet port 31a in connection with the master cylinder 10 through the conduit 17. The housing assembly 30 further includes upper and lower plugs 32, 33 which are respectively threaded into the top and bottom of housing body 31 in a fluid-tight manner to close the cylindrical bore 31b. The upper plug 32 is provided therein with an outlet port 32a in connection with the rear-wheel cylinders 14 through the conduit 18, and the housing body 31 is mounted on a portion of the vehicle body.

Within the housing assembly 30, a stepped sleeve member 21 is slidably disposed within the cylindrical bore 31b of housing body 31 through annular sealing members 21a, 21b and has a cylinder portion slidably coupled with a cylindrical projection 32b of plug 32 through an annular sealing member 32c. Thus, the interior of cylindrical bore 31b is subdivided into a first pressure chamber $R_1$ in open communication with the inlet port 31a and a second pressure chamber $R_2$ in the form of an annular chamber normally isolated from the outlet port 32a. The first chamber $R_1$ communicates with the second chamber $R_2$ across a radial hole 21c of sleeve member 21, and an annular space $R_0$ formed at the stepped portion of sleeve member 21 is open to the atmosphere through a vent hole 31c of housing body 31. The stepped sleeve member 21 is loaded upwardly in the figure by a coiled compression spring 22, which is disposed between the bottom end of sleeve member 21 and an annular retainer 23 fixed against the inner face of plug 33. In addition, the stepped sleeve member 21 has a small effective pressure receiving area in the first chamber $R_1$ and a large effective pressure receiving area in the second chamber $R_2$. When a difference between pressures acting on the small and large pressure receiving areas exceeds the setting load of compression spring 22, the sleeve member 21 will move downwardly against loading of the spring 22.

The fluid pressure control valve unit 20 further comprises a differential piston 24 which is axially reciprocable within the cylindrical bore 31b of housing body 31. The differential piston 24 has a leg portion 24a and a head portion 24b, the former being slidably received in a counter bore, provided within the lower plug 33, through an annular sealing cup 33a, and the latter being positioned within the stepped sleeve member 21. A coiled compression spring 25 is engaged at its lower end with the annular retainer 23 and at its upper end with an annular flange of piston 24 to constantly load the piston 24 upward. The head portion 24b of piston 24 is provided with an annular valve part 24c cooperable with an annular valve seat 26 fixed to an inner shoulder of sleeve member 21 to provide a cut-off valve V. The leg portion 24a of piston 24 is engaged at its bottom end with a bar spring 27, pivoted at its opposite ends on a portion of the vehicle body frame and a wheel supporting means (not shown). Thus, the differential piston 24 is additionally loaded by the bar spring 27 depending upon the vehicle load.

The differential piston 24 has small and large effective piston areas whereby opposing displacement forces may be provided on the piston 24 respectively in the directions toward and away from the outlet port 32a by the hydraulic pressure acting on the piston surfaces. Thus, the cut-off valve V is opened and closed in dependence on the position of differential piston 24 to control intercommunication between the first pressure chamber $R_1$ and a third pressure chamber $R_3$ in open communication with the outlet port 32a.

Hereinafter the mode of operation of the fluid pressure control valve unit 20 will be described in detail. In the unloaded condition of the vehicle, so long as the front and rear-wheel braking systems are in the normal condition, depression of the foot-pedal 13 produces braking pressure $P_m$ within the first and second pressure chambers 11, 12 of master cylinder 10, the value of which increases as shown by a segment 0–A in FIG. 2. The braking pressure $P_m$ from the first pressure chamber 11 is directly applied to the front-wheel cylinders 15 through the conduit 16, and the braking pressure $P_m$ from the second pressure chamber 12 is applied to the inlet port 31a of control valve unit 20 through the conduit 17. Within the control valve unit 20, the braking pressure $P_m$ is applied from the first pressure chamber $R_1$ to the third pressure chamber $R_3$ through the cut-off valve V and subsequently to the rear-wheel cylinders 14 through the conduit 18 to effect the braking operation of the vehicle. During the initial operation of the master cylinder 10, the differential piston 24 starts to move downwardly against loading of the springs 25 and 27 in accordance with the increase of the braking pressure $P_m$.

Figure 2:
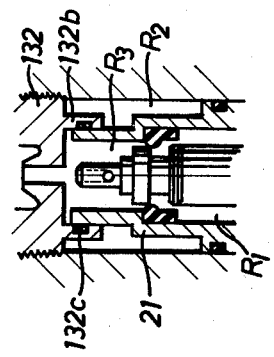
FIG. 2 is a graph indicating the pressure controlling characteristics of the control valve unit of FIG. 1.

When the braking pressure $P_m$ increases up to a value $P_1$ as shown in FIG. 2, the valve port 24c of piston 24 engages the valve seat 26 to interrupt the communication between the first and third pressure chambers $R_1$ and $R_3$. This timing falls on a point A in FIG. 2. While the cut-off valve V is closed, the pressure in the first chamber $R_1$ increases to cause upward movement of the piston 24 which results in the cut-off valve V opening again. In this manner, the closing and opening operation of the cut-off valve V occurs repeatedly in reciprocatory operation while the piston 24 is in its displaced position, thereby controlling the braking pressure $P_w$ applied to the rear-wheel cylinders 14, as shown by a dotted segment A–B in FIG. 2. Thus, the vehicle is arrested before the braking pressure $P_m$ increases up to a value $P_3$. During the normal braking operation, the cylinder portion of stepped sleeve member 21 is still coupled with the cylindrical projection 32b of upper plug 32 because the pressure difference acting on the stepped sleeve member 21 is maintained smaller than the setting load of spring 22.

In case the front-wheel braking system is not operated due to such a damage as breakage of the conduit 16, only the rear-wheel cylinders 14 are operated by the braking pressure $P_m$ applied from the second pressure chamber 12 of master cylinder 10. To arrest the vehicle, the master cylinder 10 will be operated to increase the braking pressure $P_m$ higher than that in the normal braking operation. In this instance, when the braking pressure $P_m$ exceeds the value $P_3$, the pressure difference acting on the stepped sleeve member 21 becomes larger than the setting load of spring 22, and the sleeve member 21 starts to move downwardly against the spring 22. Then, the effect of pressure control by reciprocatory operation of the piston 24 is reduced to increase the braking pressure $P_w$ applied to the rear-wheel cylinders 14 at a steep gradient, as shown by a dotted segment B–C in FIG. 2. Upon increasing of the braking pressure $P_m$ up to a high value $P_4$, the cylinder portion of sleeve member 21 separates from the cylindrical projection 32b of plug 32 to apply the braking pressure $P_m$ directly to the third pressure chamber $R_3$ from the second pressure chamber $R_2$. As a result, the function of pressure control valve unit 20 becomes inoperative, so as to increase the braking pressure $P_w$, as shown by a dotted segment C–D in FIG. 2, thereby to arrest the vehicle.

In the loaded condition of the vehicle, the loading of the bar spring 27 will increase proportionally to the increase of the vehicle load. Thus, the braking pressure $P_m$ to move the differential piston 24 downward will be required to be larger than that in the unloaded condition of the vehicle. This means that in FIG. 2 the points A, B and C are replaced with points a, b and c. Taking into account of the characteristic line 0-a-b-c-D of FIG. 2, the operation of the whole system in the loaded condition will be obviously understood from the description of the operation in the unloaded condition. In this instance, when the braking pressure $P_w$ to the rear-wheel cylinders 14 reaches a value indicated by the point b, the stepped sleeve member 21 will start to move downwardly. When the braking pressure $P_w$ reaches a value indicated by the point c, the stepped sleeve member 21 will separate from the cylindrical projection 32b of plug 32.

Figure 3:
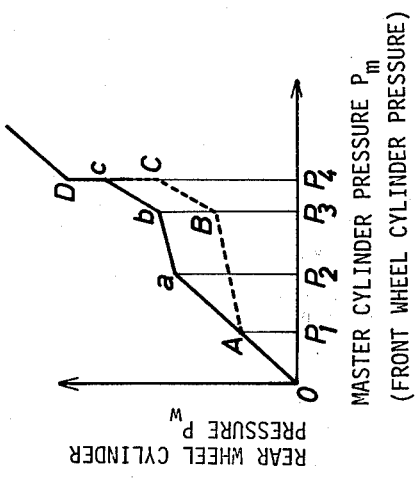
FIG. 3 is a graph indicating the pressure controlling characteristics of a modification of the control valve unit.

From the above description, it will be noted that each gradient of the segments B–C and b–c is determined by the ratio of the pressure receiving areas of sleeve member 21 and the setting load of spring 22. In case the ratio of the pressure receiving areas of stepped sleeve member 21 and the setting load of spring 22 are adjusted in an appropriate manner, the characteristic lines of FIG. 2 will be indicated as shown in FIG. 3.

Figure 4:
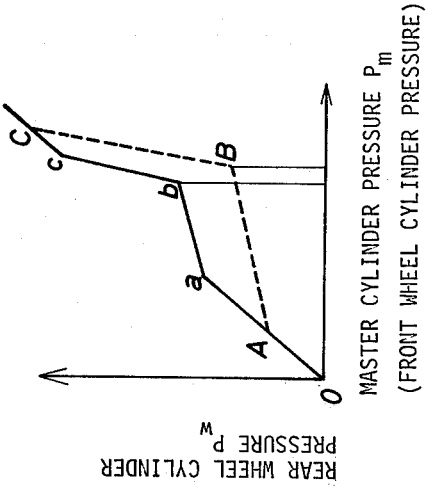
FIG. 4 illustrates a modification of a stepped sleeve member and an upper plug assembled within the control valve unit.
Figure 5:
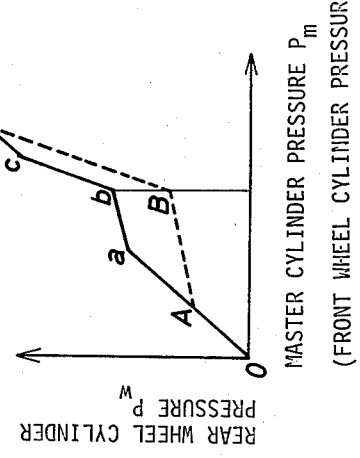
FIG. 5 is a graph indicating the pressure controlling characteristics of the control valve unit in which the modification of FIG. 4 is adapted.

In FIG. 4, there is illustrated a modification of the present invention in which the cylinder portion of stepped sleeve member 21 is slidably coupled with a cylindrical sleeve 132b of an upper plug 132 through an annular sealing member 132c. In case the modification is adapted to the control valve unit 20 of FIG. 1, the stepped sleeve member 21 will receive the braking pressure $P_m$ in the first and second pressure chambers $R_1$ and $R_2$ and the controlled pressure $P_w$ in the third pressure chamber $R_3$. As a result, the characteristic lines of FIG. 2 will be indicated as shown in FIG. 5. Furthermore, in the embodiment and modification described above, the present invention is adapted to the fluid pressure control valve unit 20 in the form of a load-sensing-valve, but it is applicable to the other type of fluid pressure control valve unit without the load-sensing means.

Although certain specific embodiments of the invention have been shown and described, it is obvious that many modifications thereof are possible. The invention, therefore, is not intended to be restricted to the exact showing of the drawings and description thereof, but is considered to include reasonable and obvious equivalents.

What is claimed is:

1. In a fluid pressure control valve unit for a vehicle braking system incorporated between a master cylinder and rear-wheel brake cylinders, comprising:

a housing provided with an inlet port for connection to said master cylinder, an outlet port for connection to said brake cylinders, and a stepped cylindrical bore including small and large diameter portions in open communication with said inlet and outlet ports respectively;

a stepped sleeve member slidably disposed within said cylindrical bore and engaged at one end thereof with the inner end-wall of said housing to enclose said outlet port, said sleeve member having small and large pressure receiving areas exposed within the small and large diameter portions of said bore and subdividing said bore into a first chamber in communication with said inlet port and a second chamber in the form of an annular chamber normally isolated from said outlet port and communicated with said first chamber therethrough;

a first spring for loading said sleeve member in the direction toward a usual position in which said second chamber is isolated from said outlet port;

a differential piston axially reciprocable within said sleeve member to provide a third chamber in open communication with said outlet port, said piston having small and large effective piston areas whereby opposing displacement forces may be provided on said piston respectively in the directions toward and away from said outlet port;

valve means including a valve seat provided within said sleeve member and a valve part of said piston cooperable with said valve seat for controlling intercommunication between said first and third chambers in dependence upon the displaced position of said piston; and a second spring for loading said piston in the direction toward a usual position in which said valve means opens to permit fluid communication between said first and third chambers.

2. A fluid pressure control valve unit as claimed in claim 1, further comprising load sensing means operative to increase the loading on said differential piston in the direction toward said outlet port on increasing the vehicle loading.

3. A fluid pressure control valve unit as claimed in claim 2, wherein said loaded sensing means includes a bar spring whose opposite ends are pivoted on a portion of the vehicle body frame and a wheel supporting means, said bar spring being operatively connected to said differential piston.

4. A fluid pressure control valve unit as claimed in claim 1, wherein said housing is provided with a plug member threaded into the large diameter portion of said stepped cylindrical bore and having a cylindrical projection enclosing said outlet port, and said sleeve member is provided with a cylinder portion slidably coupled with said cylindrical projection of said plug member to normally isolate said second chamber from said third chamber.

5. A fluid pressure control valve unit as claimed in claim 1, wherein said housing is provided with a plug member threaded into the large diameter portion of said stepped cylindrical bore and having a cylindrical sleeve enclosing said outlet port, and said sleeve member is provided with a cylinder portion slidably coupled within said cylindrical sleeve of said plug member to normally isolate said second chamber from said third chamber.

* * * * *